US011372271B2

(12) United States Patent
Hu et al.

(10) Patent No.: US 11,372,271 B2
(45) Date of Patent: Jun. 28, 2022

(54) OPTICAL MODULATOR, METHOD FOR FORMING THE SAME, AND METHOD FOR CONTROLLING THE SAME

(71) Applicant: Nanyang Technological University, Singapore (SG)

(72) Inventors: Xiaonan Hu, Singapore (SG); Guozhen Liang, Singapore (SG); Bo Meng, Singapore (SG); Qijie Wang, Singapore (SG)

(73) Assignee: Nanyang Technological University, Singapore (SG)

( * ) Notice: Subject to any disclaimer, the term of this patent is extended or adjusted under 35 U.S.C. 154(b) by 52 days.

(21) Appl. No.: 16/628,581

(22) PCT Filed: Jun. 7, 2018

(86) PCT No.: PCT/SG2018/050284
§ 371 (c)(1),
(2) Date: Jan. 3, 2020

(87) PCT Pub. No.: WO2019/009801
PCT Pub. Date: Jan. 10, 2019

(65) Prior Publication Data
US 2020/0150465 A1 May 14, 2020

(30) Foreign Application Priority Data
Jul. 6, 2017 (SG) .......................... 10201705574R

(51) Int. Cl.
*G02F 1/025* (2006.01)
(52) U.S. Cl.
CPC .......... *G02F 1/025* (2013.01); *G02F 2203/10* (2013.01)

(58) Field of Classification Search
None
See application file for complete search history.

(56) References Cited

U.S. PATENT DOCUMENTS

| 2008/0044128 A1* | 2/2008 | Kish, Jr. ............ G02B 6/12004 385/14 |
| 2013/0105795 A1 | 5/2013 | Kim et al. |

(Continued)

FOREIGN PATENT DOCUMENTS

CN 106199837 A 12/2016

OTHER PUBLICATIONS

Ansell, D., et al., "Hybrid graphene plasmonic waveguide modulators", Nature Communications, pp. 1-6, 2015.
(Continued)

*Primary Examiner* — Jerry Rahll
(74) *Attorney, Agent, or Firm* — Womble Bond Dickinson (US) LLP

(57) ABSTRACT

According to embodiments of the present invention, an optical modulator is provided. The optical modulator includes a substrate, and a waveguiding arrangement on the substrate, the waveguiding arrangement having a waveguide, and at least one graphene layer arranged to interact with light propagating in the waveguiding arrangement, wherein the waveguide is designed such that the light interacting with the at least one graphene layer has a maximum intensity overlapping with the at least one graphene layer. According to further embodiments of the present invention, a method for forming the optical modulator, and a method for controlling the optical modulator are also provided.

18 Claims, 4 Drawing Sheets

(56) References Cited

U.S. PATENT DOCUMENTS

2014/0056551 A1 2/2014 Liu et al.
2015/0369660 A1 12/2015 Yu

OTHER PUBLICATIONS

Aznakayeva, D. E., et al., "Graphene light modulators working at near-iuftared wavelengths", Optics Express, vol. 25, No. 9, pp. 10255-10260, 2017.

Balci, O., et al., "Rapid thermal annealing of graphene-metal contact," Applied Physics Letters, vol. 101, p. 243105.1-243105.5, 2012.

Bao, Q., et al., "Graphene photonics, plasmonics, and broadband optoelectonic devices," ACS Nano, vol. 6, No. 5, pp. 3677-3694, 2012.

Bonaccorso, F., et al., "Graphene photonics and optoelectronics," Nature Photonics, vol. 4, No. 9, pp. 611-622, 2010.

Brar, V. W., et al., "Highly Confined Tunable Mid-Infrared Plasmonics in Graphene Nanoresonators," Nano Letters, vol. 13, No. 6, pp. 2541-2547, 2013.

Dabidian, N., et al., "Electrical switching of infrared light using Graphene integration with plasmonic Fano resonant metasurfaces," ACS Photonics, vol. 2, No. 2, pp. 216-227, 2015.

Dalir, H., et al., "Athermal broadband graphene optical modulator with 35 GHz speed," ACS Photonics, vol. 3, No. 9, pp. 1564-1568, 2016.

Emani, N. K., et al., "Electrical Modulation of Fano Resonance in Plasmonic nanostructures using Graphene," Nano Letters, vol. 14, No. 1, pp. 78-82, 2014.

Emani, N. K., et al., "Electrically tunable damping of plasmonic resonances with Graphene," Nano Lett., vol. 12, No. 10, pp. 5202-5206, 2012.

Kleinert, M., et al., "Graphene-based electro-absorption modulator integrated in a passive polymer waveguide platform", Optical Materials Express, vol. 6, No. 6, pp. 1800-1807, 2016.

Leong, W. S., et al., "Low-contact-resistance Graphene devices withNickel-etched-Graphene contacts," ACS Nano, vol. 8, No. 1, pp. 994-1001, 2014.

Li, W., et al., "Ultrafast all-optical graphene modulator," Nano Lett., vol. 14, No. 2, pp. 955-959, 2014.

Li, Z., et al., "Modulation of mid-infared light using graphene-metal plasmonic antennas," Applied Physics Letters, vol. 102, pp. 131108-1-131108-5, 2013.

Liang, G., et al., "Integrated terahertz Graphene modulator with 100% modulation depth," ACS Photonics, vol. 2, No. 11, pp. 1559-1566, 2015.

Liu, A., et al., "A high-speed silicon optical modulator based on a metal-oxide-semiconductor capacitor," Nature, vol. 427, No. 6975, pp. 615-618, 2004.

Liu, M., et al., "A graphene-based broadband optical modulator," Nature, vol. 474, No. 7349, pp. 64-67, 2011.

Nedeljkovic, M., et al., "Mid-Infrared thermo-optic modulators in SoI," IEEE Photonics Technology Letters, vol. 26, No. 13, pp. 1352-1355, 2014.

Nedeljkovic, M., et al., "Predictions of free-carrier electroabsorption and electrorefraction in germanium," IEEE Photonics Journal, vol. 7, No. 3, 2015.

Novoselov, K. S., et al., "Two-dimensional gas of massless Dirac fermions in graphene," Nature, vol. 438, No. 7065, pp. 197-200, 2005.

Radko, I. P., et al., "Maximum modulation of plasmon-guided modes by graphene gating", Optics Express, vol. 24, No. 8, 8266-8279, 2016.

Reed, G. T., et al., "Silicon optical modulators," Mater. Today, vol. 8, No. 1, pp. 40-50, 2005.

Van Camp, M. A., et al., "Demonstration of electooptic modulation at 2165nm using a silicon Mach-Zehnder interferometer," Optics Express, vol. 20, No. 27, pp. 28009-28016, 2012.

Williams, B. S. "Terahertz quantum-cascade lasers," Nature photonics, vol. 1, No. 9, pp. 517-525, 2007.

Xu, H., et al., "High-speed silicon modulator with band equalization," Optics Letters, vol. 39, No. 16, pp. 4839-4842, 2014.

Yao, Y., et al., "Broad electrical tuning of graphene-loaded plasmonic antennas," Nano Letters, vol. 13, No. 3, pp. 1257-1264, 2013.

Yao, Y., et al., "Electrically tunable metasurface perfect absorbers for ultrathin mid-infrared optical modulators," Nano Letters, vol. 14, No. 11, pp. 6526-6532, 2014.

Yao, Y., et al., "Wide wavelength tuning of optical antennas on Graphene with nanosecond response time," Nano Letters, vol. 14, No. 1, pp. 214-219, 2014.

* cited by examiner

OPTICAL MODULATOR, METHOD FOR FORMING THE SAME, AND METHOD FOR CONTROLLING THE SAME

CROSS-REFERENCE TO RELATED APPLICATIONS

This application is a national stage filing under 35 U.S.C. § 371 of PCT/SG2018/050284, filed 7 Jun. 2018, which International Application was published by the International Bureau in English on 10 Jan. 2019, and claims the benefit of priority of Singapore patent application No. 10201705574R, filed 6 Jul. 2017, which applications are hereby incorporated by reference in their entirety for all purposes.

TECHNICAL FIELD

Various embodiments relate to an optical modulator, a method for forming an optical modulator, and a method for controlling an optical modulator.

BACKGROUND

Silicon is the most dominant material for most applications in the world of electronics since 1950s. People spent decades to understand and develop the fabrication infrastructure which is not competed by any other material. Because of the increasing demand for applications such as servers, cloud computing, video service, etc. in the current information age, the known copper medium is not suitable for high speed communication links due to the increasing material loss as well as the return loss of the device. Alternatively, people started to solve these limitations by relying on the optical communication since 1980s. Here comes the study of silicon photonics where the optoelectronics devices are realized on the silicon platform with the available Complementary-Metal-Oxide-Semiconductor (CMOS) technology in the electronics world.

The main drive for silicon photonics today is to build all functional components on a single chip with a compact size and powerful functions. In addition, it helps the integration of the optical functions with the electronics part such as the driver, the control, etc. Among all the optoelectronic devices, the optical modulator is one of the most important components in the communication process where light can be modulated to carry the electrical information. The performance metrics of the modulator decides the quality of the communication process such as the bandwidth and the reach distance, etc. Because of the weak electro-optic and nonlinear effect, the only effective mechanism to modulate light in Si is based on the free-carrier plasma dispersion where the tuning of the carrier concentration leads to the change of the refractive index, and, hence, a corresponding phase-shift results when the light propagates. As a result, a large number of studies have been carried out based on this effect, including the first high-speed modulator where the modulation speed reached 1 GHz in 2004 using field-effect transistor configuration, and a modulation speed of 70 GBit/s in 2014 using carrier depletion mechanism in the reverse-biased diode configuration. However, almost all the studies focused on the near-infrared region where the wavelength is around 1.55 μm; the explorations of the modulator structure towards longer wavelength are rarely reported. To the best of our knowledge, there are only two available demonstrations of Si modulator towards longer wavelength region: an optical modulator at 2165 nm has been demonstrated with an extinction ratio of 23 dB and data transmission rate up to 3 Gbit/s; and another thermo-optic modulator at 3.8 μm has been demonstrated with limited modulation bandwidth of 23.8 kHz due to the slow thermal based modulation scheme. The main reason for the rare study of Si modulator in longer wavelength is because of the prediction that the configuration for the near-infrared modulator is not suitable for the mid-infrared due to the increased electro-absorption effect in silicon.

Graphene has become attractive to researchers recently due to its excellent electrical and optical properties. The electrostatic doping of graphene would block the interband optical transitions with energy less than two times the Fermi energy of graphene due to the Pauli-blocking principle. The carrier mobility in graphene is much faster than that in Si itself, which leads to inherently fast response of graphene to incoming light. For example, an ultrafast optical modulation of graphene with a high speed of 200 GHz has been demonstrated. However, the intrinsic graphene has a universal weak absorption of 2.3% across all wavelengths for a vertical incoming light, which is relatively small for certain applications. On the other hand, when graphene is transferred on top and integrated with the silicon platform, the increased interaction length through evanescent coupling helps realize a sufficient modulation depth which is suitable for the communication process. In addition, the linear and gapless dispersion in graphene is advantageous for a broadband response of graphene to light. With such mechanism, the first graphene-based optical modulator on Si was demonstrated with an efficient broadband modulation between 1.35-1.6 μm and a 3 dB modulation bandwidth of 1 GHz. With the continuous developments of the process as well as the optimized structure, a double-layer graphene-based Si modulator reached a 3 dB modulation bandwidth of 35 GHz with a simple straight waveguide configuration, by taking RC effect into consideration where further improvement is still promising.

As graphene has been demonstrated to show remarkable photoresponse to MIR light, it is also attractive to realize a graphene-based modulator in the mid-infrared region where known Si modulators cannot be applied as mentioned above. As a result, there are many studies on graphene-based MIR modulators. For example, by incorporating graphene with an antenna structure or metamaterial/metasurface, the modulation of mid-infrared light is effectively achieved in terms of both the peak reflectivity and the center wavelength. Further, a high speed tunable perfect absorber with an optical modulation up to 95% has been demonstrated with 3 dB cutoff frequency as high as 20 GHz at 6.3 μm, confirmed by the analysis of the corresponding circuit model.

Unfortunately, all the demonstrated MIR optical modulation relies on the free space coupling of light into graphene. Further, the existing studies of graphene-based Si modulator are only focusing on the near-infrared region.

SUMMARY

The invention is defined in the independent claims. Further embodiments of the invention are defined in the dependent claims.

According to an embodiment, an optical modulator is provided. The optical modulator may include a substrate, and a waveguiding arrangement on the substrate, the waveguiding arrangement having a waveguide, and at least one graphene layer arranged to interact with light propagating in the waveguiding arrangement, wherein the waveguide is designed such that the light interacting with the at least one graphene layer has a maximum intensity overlapping with the at least one graphene layer.

According to an embodiment, a method for forming an optical modulator is provided. The method may include forming a waveguiding arrangement on a substrate, including forming a waveguide, and forming at least one graphene layer to interact with light propagating in the waveguiding arrangement, wherein forming a waveguide comprises designing the waveguide such that the light interacting with the at least one graphene layer has a maximum intensity overlapping with the at least one graphene layer.

According to an embodiment, a method for controlling an optical modulator is provided. The method may include supplying a light to a waveguiding arrangement of the optical modulator for propagation in the waveguiding arrangement, the waveguiding arrangement having a waveguide, and at least one graphene layer arranged to interact with the light, wherein the waveguide is designed such that the light interacting with the at least one graphene layer has a maximum intensity overlapping with the at least one graphene layer, and applying an electrical signal to the at least one graphene layer.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 3A shows a perspective schematic view of a fabricated optical modulator, while

DETAILED DESCRIPTION

Figure 1A:
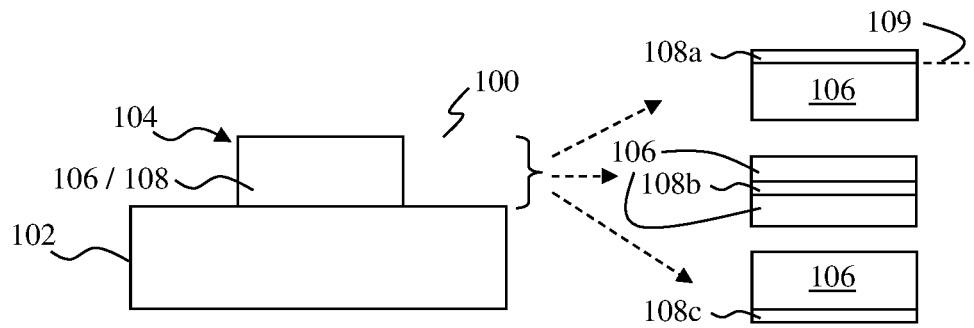
FIG. 1A shows a schematic cross-sectional view of an optical modulator, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

With the continuous advances in the last several decades, the low cost of silicon material and the improved Complimentary-Metal-Oxide-Semiconductor (CMOS) technology has led to a tremendous development of silicon (Si) photonics. Many important components are already demonstrated on the platform including the high-speed modulator, low-loss waveguide and even monolithic light source, etc. Besides the studies of Si platform in the near-infrared (NIR) region, the same platform is also promising for applications in the mid-infrared (MIR) region because Si is inherently transparent up to 8.5 μm. The well-developed CMOS infrastructure is ideal to build low-cost, powerful MIR Si platform. Optical modulator is one of the most important components on the platform. However, known configurations of Si modulator in the NIR region cannot be directly applied to MIR Si platform due to the increased electro-absorption effect in Si. Alternatively, graphene has been used for the modulation of MIR light where effective modulation can be realized in terms of both peak reflectivity and center wavelength; unfortunately, all the works rely on the free-space coupling of vertical light to the device, which cannot be integrated with the MIR Si platform.

Various embodiments may relate to surface plasmon and waveguide enhanced graphene modulation in mid-infrared region (MIR).

Various embodiments may provide a device or optical modulator having or consisting of a MIR quantum cascade layer (QCL), a surface plasmonic waveguide-based graphene modulator and a directional optical power out-coupler. The MIR QCL may be bonded epilayer down onto a receiver substrate using thermo-compression method.

In various embodiments, there is provided a graphene-based MIR modulator on Si platform, compatible with other components on the same platform. Because of the broadband response of graphene to light, the modulator may even work in a broadband region in MIR. Various embodiments may provide a graphene-based modulator on a surface plasma (or plasmon) waveguide at 9 μm, which may be monolithically integrated with an on-chip Quantum Cascade Laser (QCL) ridge. Because of the waveguide-based configuration, the increased interaction length may help achieve a sufficient modulation depth, whereas the intrinsic single-layer graphene has a weak universal absorption of 2.3% per layer. By tuning the applied voltage on the graphene layer, hence the transmission state of graphene layer, sufficient modulation efficiency may be achieved by the device. The results obtained for various embodiments are promising for the development of a high-performance graphene-based modulator on MIR Si platform, where a MIR Si modulator has so far remained missing.

As mentioned, all the demonstrated or known MIR optical modulation relies on the free space coupling of light into graphene; no experimental work has been done on MIR CMOS-compatible Si platform where the existing studies of graphene-based Si modulator are only focusing on the near-infrared region. In view of this, various embodiments may include the configuration of a dielectric-loaded surface plasma waveguide to enable enhanced graphene-light interaction at 9 μm for modulation purposes, where (effectively) broadband optical modulation may be achieved with the tuning of graphene (e.g., single- or double-layer graphene). As graphene is also CMOS-compatible, hence, the entire device of various embodiments may be promising for the integration with other components on the same platform. In addition, the device may even work at longer wavelengths where the optical loss in Si may become intolerable. The results obtained for various embodiments may be interesting and promising for a number of applications where on-chip modulation may be necessary.

FIG. 1A shows a schematic cross-sectional view of an optical modulator 100, according to various embodiments. The optical modulator 100 includes a substrate 102, and a waveguiding arrangement 104 on the substrate 102, the waveguiding arrangement 104 having a waveguide 106, and at least one graphene layer 108 arranged to interact with light propagating in the waveguiding arrangement 104, wherein the waveguide 106 is designed such that the light interacting with the at least one graphene layer 108 has a maximum intensity overlapping with the at least one graphene layer 108.

In other words, an optical modulator 100 may be provided. The optical modulator 100 may be employed for light modulation, e.g., tuning of light intensity. The optical modulator 100 may include a waveguiding arrangement 104 for propagation of light therethrough and/or therewithin. The waveguiding arrangement 104 may be formed or arranged on or on top of a substrate 102. The waveguiding arrangement 104 may include a (optical) waveguide 106 and at least one graphene layer 108. As such, the optical modulator 100 may be a graphene modulator. The at least one graphene layer 108 may be supported by the waveguide 106. The waveguide 106 may be or may include a ridge waveguide. The at least one graphene layer 108 may be configured to interact with light propagating in the waveguiding arrangement 104. The waveguide 106 may be designed such that the light interacting with the at least one graphene layer 108 may have a maximum intensity overlapping with (or is at) the at least one graphene layer 108. This may mean that the light may have an intensity profile where its maximum may coincide with the at least one graphene layer 108.

By having the maximum intensity of the light overlapping with the at least one graphene layer 108, an enhanced graphene-light interaction may be provided.

As compared to an arbitrarily provided waveguide, the waveguide 106 of various embodiments may help to shift the maximum intensity of the light propagating in the waveguiding arrangement to the at least one graphene layer 108.

In various embodiments, in response to an electrical signal (e.g., a voltage) applied to the at least one graphene layer 108, the optical modulator 100 may be configured to modulate (an intensity of) the light. By applying an electrical signal to the at least one graphene layer 108 and/or changing (or tuning) a magnitude of the electrical signal applied thereto, the optical absorption or the transmission state of the at least one graphene layer 108 may be varied or modulated. Consequently, the light propagating in the waveguiding arrangement and interacting with the at least one graphene layer 108 may be modulated as a result of the change in the absorption characteristic of the at least one graphene layer 108, which in turn may change an intensity level of the light. This may mean that when the light propagates within the waveguide arrangement 104, the graphene layer 108 may interact with the light and the modulation of the transmission state of the graphene layer 108 may lead to the modulation of the light in the optical modulator 100. In this way, light outputted from the optical modulator 100 may be modulated. Accordingly, the optical modulator 100 may modulate the intensity of light coupled to the waveguide arrangement 104 (e.g., which may be or include a plasmonic waveguide).

Regarding modulation of the at least one graphene layer 108 and its effect, in greater details, the absorption characteristic or the transmission state of the at least one graphene layer 108 may be modulated. Without wishing to be bound by any theory, when the at least one graphene layer 108 is tuned with an electrical signal (e.g., voltage), electrons may be injected into or depleted in the graphene layer 108, which leads to the change of the Fermi level in the graphene layer 108. The latter is related to the complex refractive index of graphene, for example, the imaginary part, which is proportional to the optical absorption of the material. Therefore, when the at least one graphene layer 108 is tuned, its optical absorption is changed, so that the intensity (or power) of the light going through the modulator 100 is changed.

Put in another way, the at least one graphene layer 108 is in the "transmission state" where there is no substantial loss to the light when the interband transition is blocked in the graphene layer 108. When there is loss in the graphene layer 108, the transmission of the optical modulator 100 is also reduced. Without wishing to be bound by any theory, the above may be ascribed to the Pauli blocking mechanism which may explain the interband transition and thus the modulation of the graphene layer 108.

In various embodiments, the waveguide 106 may be designed (or dimensioned) to have a thickness of between about 250 nm and about 450 nm, for example, between about 250 nm and about 400 nm, between about 250 nm and about 300 nm, between about 300 nm and about 450 nm, or between about 300 nm and about 400 nm. As non-limiting examples, the waveguide 106 may have a thickness of about 300 nm or about 400 nm.

In various embodiments, the waveguide 106 may be designed (or dimensioned) to have a width of between about 15 μm and about 30 μm, for example, between about 15 μm and about 25 μm, between about 15 μm and about 20 μm, between about 20 μm and about 30 μm, between about 25 μm and about 30 μm, or between about 20 μm and about 25 μm.

In various embodiments, the waveguide 106 may be designed to have a refractive index or an effective modal (refractive) index of between about 1.005 and about 1.02, for example, between about 1.005 and about 1.015, between about 1.005 and about 1.01, between about 1.01 and about 1.02, or between about 1.01 and about 1.015.

The waveguide thickness and/or the waveguide width may affect the mode distribution and, hence, the interaction between the waveguide 106 and the graphene layer 108, and, consequently, graphene-light interaction. The dimension of the waveguide 106 may also be correlated with the wavelength: the larger the wavelength, the larger the dimension. Further, the mode distribution may depend on the refractive index of the material of the waveguide 106 because the graphene layer 108 may be an ultrathin layer compared to them. The graphene-light interaction may be quantified by the mode confinement in the graphene layer 108, which may, for example, be studied by simulations.

As a non-limiting example, for MIR wavelength, a thickness of around 400 nm for the waveguide 106 may lead to substantial graphene-light interaction. Below ~400 nm thickness, there may be a trade-off between the propagation loss of the waveguide 106 and the graphene-light interaction. A thinner waveguide 106 may lead to a reduced propagation loss as the mode may extend longer into the air and the interaction between the light and the material (e.g., metal) beneath the waveguide 106 may be reduced, which may also mean a reduction in the mode confinement in the graphene layer 108. A thicker layer (e.g., >450 nm) may potentially reduce the graphene-light interaction, and may also result in a larger propagation loss of the waveguide 106 since it may re-distribute the mode intensity so that a significant portion of the light may now be confined at the interface between the waveguide 106 and the underlying material.

In various embodiments, the waveguide 106 may include or may be a dielectric waveguide. The dielectric waveguide may be a dielectric-loaded surface plasmon waveguide. In various embodiments, a reference to the "refractive index" may, for embodiments with a dielectric-loaded surface plasmon waveguide, refer to the effective modal refractive index of the dielectric-loaded surface plasmon waveguide. The dielectric-loaded surface plasmon waveguide may be designed to have an effective modal refractive index as described above.

In various embodiments, the waveguide 106 may be at least substantially transparent.

In the context of various embodiments, the waveguide 106 may include at least one of silicon nitride (SiN), sapphire, amorphous silicon (a-Si), silicon (Si), gallium arsenide (GaAs), or germanium (Ge). As non-limiting examples, SiN may be a suitable material for applications of the optical modulator 100 in the infra-red region (e.g., MIR), for example, for ≥4 μm, while Si and GaAs may be suitable materials for applications of the optical modulator 100 in the terahertz (THz) region. For an optical modulator 100 working at a particular wavelength, a material with negligible or minimal loss at that wavelength may be employed for the waveguide 106.

In various embodiments, the at least one graphene layer (illustrated as 108a) may be arranged on top of the waveguide 106 (e.g., on a top or external surface of the waveguide 106). For example, the at least one graphene layer 108a may be arranged at or towards the top or upper portion or region of the waveguide 106. This may mean that the at least one graphene layer 108a may be arranged distal to the substrate 102. In various embodiments, this may further mean that the at least one graphene layer 108a may be arranged on the waveguide 106 at a location coinciding with an "imaginary" waveguide-air interface (represented by dashed line 109). As such, this may mean that the waveguide 106 may be designed such that the light propagating in the waveguide arrangement 102 may have a maximum intensity at the "imaginary" waveguide-air interface 109 where the at least one graphene layer 108a may be arranged so that the maximum intensity of the light overlaps with (or is at) the at least one graphene layer 108a.

In further embodiments, the at least one graphene layer (illustrated as 108c) may be arranged below or beneath the waveguide 106. For example, the at least one graphene layer 108c may be arranged at or towards the bottom or lower portion or region of the waveguide 106. This may mean that the at least one graphene layer 108c may be arranged proximal to the substrate 102.

In various embodiments, the at least one graphene layer (illustrated as 108b) may be embedded (or disposed or positioned) within the waveguide 106.

Nevertheless, it should be appreciated that it may be possible to arrange the at least one graphene layer 108 in any position as long as the at least one graphene layer 108 may interact with the propagating light in the manner as described, and may be tuned.

It should be appreciated that irrespective of the position of the graphene layer 108, the waveguide 106 may be designed such that the light interacting with the graphene layer 108 has a maximum intensity overlapping with the graphene layer 108. The mode distribution of the light may depend on the dimension and/or the refractive index of the material of the waveguide 106 and/or the cladding material. This dependence may be because of the graphene layer 108 being an ultrathin layer compared to the waveguide 106 and the cladding. As an example, if it is a single dielectric waveguide without the plasmons, the maximum intensity may be located within the waveguide core. It may be possible for the graphene layer to be positioned at the side of the waveguide on which the light is less confined; this may lead to a stronger interaction. In this case, the evanescent tail of the mode may interact with the graphene layer; but it has to be designed properly such that the evanescent interaction may be sufficiently substantial for modulation of the light. On the other hand, if the graphene layer is sandwiched in between two dielectric layers or embedded within a dielectric waveguide, the maximum intensity may be located within the graphene layer due to the ultrathin thickness of the graphene layer itself.

In various embodiments, the optical modulator 100 may include two graphene layers 108 (e.g., double-layer graphene) arranged spaced apart from each other, including, for example, any two of graphene layers 108a, 108b, 108c. With suitable design, the mode size of the light may be large enough to interact with both graphene layers 108 at the same time. Providing two graphene layers 108 may double the modulation efficiency, with proper gating. As a non-limiting example, one graphene layer (e.g., 108a) may be arranged on top of the waveguide 106 while the other graphene layer (e.g., 108c) may be arranged beneath the waveguide 106.

In various embodiments, the substrate 102 may include a metal, or a metal layer. The waveguiding arrangement 104 may be provided or arranged on the metal layer. The waveguiding arrangement 104 may be in contact with the metal layer.

In the context of various embodiments, the metal or the metal layer may include at least one of gold (Au) or silver (Ag).

In the context of various embodiments, the substrate 102 may be or may include a semiconductor substrate, e.g., a silicon (Si) substrate.

In various embodiments, the waveguide 102 may be plasmonic waveguide or a surface plasmon waveguide. This may mean that the waveguide 102 may be a dielectric waveguide on a metal (e.g., as part of the substrate). The plasmonic waveguide may support surface plasmon mode or propagation of surface plasmon waves. Therefore, a surface-plasmon-waveguide-based graphene modulator may be provided.

The optical modulator 100 may further include an optical source optically coupled to the waveguiding arrangement 104. The optical source may determine the operating wavelength of the optical modulator 100. The optical source may be arranged on the input side of the waveguiding arrangement 104. The optical source may provide light to the waveguiding arrangement 104 for propagation therethrough. The optical source may be formed on the substrate 102.

In various embodiments, the optical source may include a source waveguide arranged coaxially or aligned with the waveguide 106 of the waveguiding arrangement 104. The source waveguide may be or may include a ridge waveguide. In this way, there may be provided a waveguide-based coupling of light as compared to free space coupling.

In various embodiments, the optical source may be monolithically integrated with the waveguiding arrangement 104.

In various embodiments, the optical source may include a quantum cascade laser (QCL).

In various embodiments, the optical source may be configured to output light in the mid-infra red (MIR) region, meaning that the optical source may be an MIR optical source.

The optical modulator 100 may further include an optical out-coupler optically coupled to the waveguiding arrangement 104. The optical out-coupler may be arranged on the output side of the waveguiding arrangement 104. The optical out-coupler may be an extension of the waveguide 106. The optical out-coupler may provide an output light which may be a directional output light, and/or a collimated output light, and/or a surface emitting output light. In various embodiments, the optical out-coupler may include a grating. In various embodiments, the optical out-coupler may be fan-shaped.

The optical modulator 100 may further include one or more contacts or electrodes for application of an electrical signal to the at least one graphene layer 108. The contact(s) may be arranged on the waveguiding arrangement 104, for example, on the at least one graphene layer 108. The contact(s) may include at least one of titanium (Ti), chromium (Cr), aluminum (Al), copper (Cu), palladium (Pd), nickel (Ni), platinum (Pt), or gold (Au). As non-limiting examples, the contact may be Au on top of any one of Ti, Cr, or Ni, which may serve as an adhesive layer between the underlying material and Au. Further, depending on the fabrication consideration, Au may be replaced with any one of Cu, Pd, Al or Pt. For example, Cu is CMOS compatible while Au may not be.

The optical modulator 100 may work across a broad range of wavelengths, including infra-red region and terahertz region. The dimension (e.g., thickness) and/or choice of the material of the waveguide 106 may be changed or adjusted in accordance to the wavelength. While not wishing to be bound by any theory, one reason for the broad range of wavelengths may be the use of graphene, which is responsive in a wide wavelength range.

In various embodiments, as a dielectric-loaded surface plasmonic waveguide may strongly confine light, the need for additional resonance elements may be eliminated. Such resonance elements may be micro-cavities or optical antennas, which are normally used to confine light into a small volume and, thus, enhance the light-matter interaction. In known modulators, such resonance elements are used and are placed on top of the relevant structures to confine light.

As described, various embodiments may provide a graphene-based MIR modulator on Si platform.

Figure 1B:
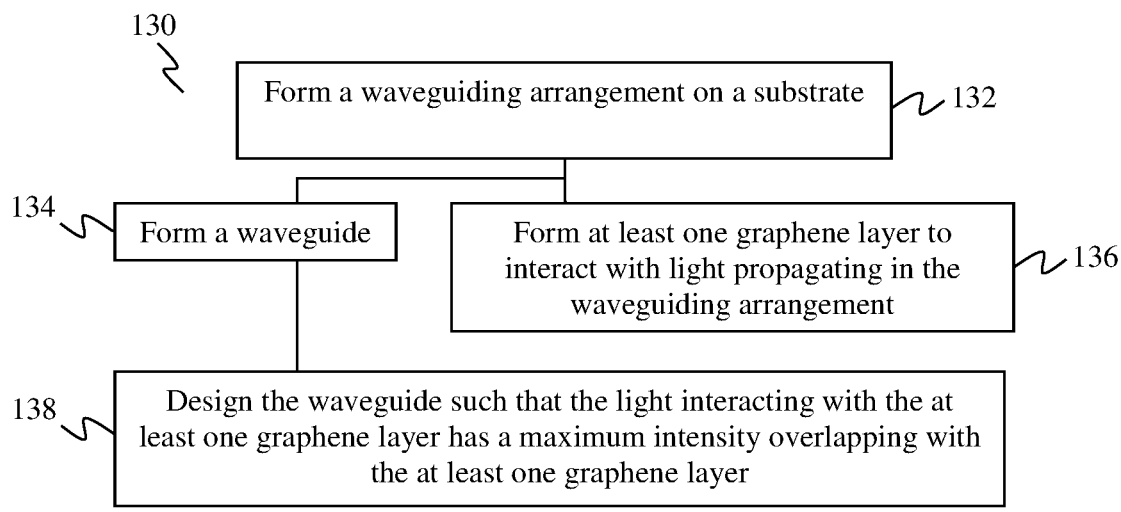
FIG. 1B shows a flow chart illustrating a method for forming an optical modulator, according to various embodiments.

FIG. 1B shows a flow chart 130 illustrating a method for forming an optical modulator, according to various embodiments.

At 132, a waveguiding arrangement is formed on a substrate.

For forming the waveguide arrangement, at 134, a waveguide is formed, and, at 136, at least one graphene layer is formed to interact with light propagating in the waveguiding arrangement.

For forming the waveguide, at 138, the waveguide is designed such that the light interacting with the at least one graphene layer has a maximum intensity overlapping with the at least one graphene layer.

In various embodiments, at 138, a thickness of the waveguide may be designed to be between about 250 nm and about 450 nm for example, between about 250 nm and about 400 nm, between about 250 nm and about 300 nm, between about 300 nm and about 450 nm, or between about 300 nm and about 400 nm.

In various embodiments, at 138, a width of the waveguide may be designed to be between about 15 µm and about 30 µm, between about 15 µm and about 25 µm, between about 15 µm and about 20 µm, between about 20 µm and about 30 µm, between about 25 µm and about 30 µm, or between about 20 µm and about 25 µm.

In various embodiments, at 138, a refractive index or an effective modal (refractive) index of the waveguide may be designed to be between about 1.005 and about 1.02, for example, between about 1.005 and about 1.015, between about 1.005 and about 1.01, between about 1.01 and about 1.02, or between about 1.01 and about 1.015.

The waveguide may be or include a dielectric waveguide. The dielectric waveguide may be a dielectric-loaded surface plasmon waveguide. In various embodiments, the dielectric-loaded surface plasmon waveguide may be designed to have an effective modal refractive index as described above.

At 136, the at least one graphene layer may be formed on top of the waveguide.

At 136, two graphene layers may be formed spaced apart from each other.

In various embodiments, an optical source may be optically coupled to the waveguiding arrangement. The optical source may be monolithically integrated with the waveguiding arrangement.

Figure 1C:
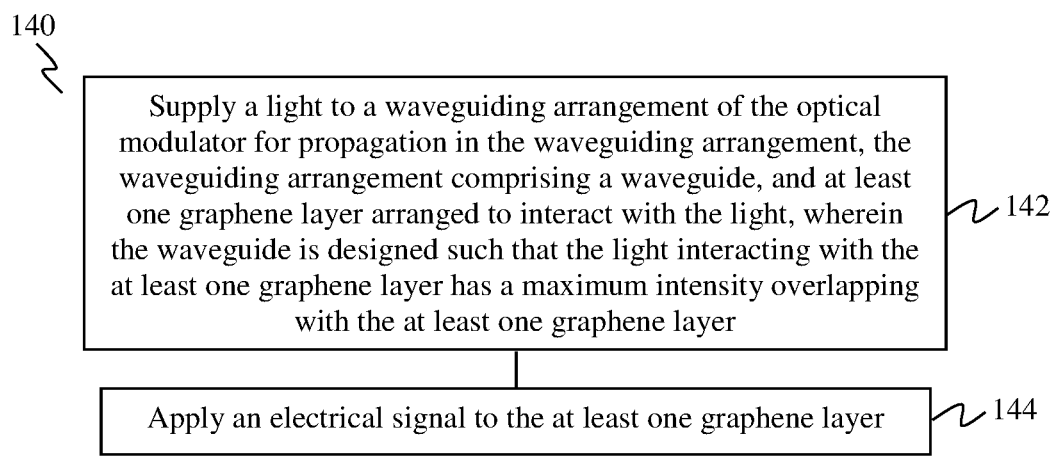
FIG. 1C shows a flow chart illustrating a method for controlling an optical modulator, according to various embodiments.

FIG. 1C shows a flow chart 140 illustrating a method for controlling an optical modulator, according to various embodiments.

At 142, a light is supplied to a waveguiding arrangement of the optical modulator for propagation in the waveguiding arrangement. The waveguiding arrangement includes a waveguide, and at least one graphene layer arranged to interact with the light, wherein the waveguide is designed such that the light interacting with the at least one graphene layer has a maximum intensity overlapping with the at least one graphene layer.

At 144, an electrical signal is applied to the at least one graphene layer.

In various embodiments, a magnitude of the electrical signal may be varied or tuned.

It should be appreciated that descriptions in the context of the optical modulator 100 may correspondingly be applicable in relation to the methods as described in the context of the flow charts 130, 140.

As non-limiting examples, the optical modulator of various embodiments may be described as a MIR optical modulator; in other words, an optical modulator operable in or suitable for operation in the mid-infrared (MIR) region. However, it should be appreciated that description in the context of the MIR optical modulator may correspondingly be applicable also to optical modulators of various embodiments that may be operable in other wavelengths or wavelength ranges.

An MIR Si based optical modulator may be provided in various embodiments, which may be realized by the transfer of graphene on top of a dielectric-loaded surface plasma waveguide, and the subsequent modulation of the graphene material. When light propagates within the MIR waveguide, meaning the dielectric-loaded waveguide, the surface graphene layer may interact with the light, and modulation of transmission in the graphene layer may lead to the modulation of the light in the device. For the silicon (Si) wafer used for forming the optical modulator, the Si material may be intrinsic/low-doped in order to reduce the free-carrier absorption in the Si material, and, thus, the insertion loss of the device or modulator. Because of the long MIR wavelength as compared to the NIR wavelength, the light may effectively interact with the surface graphene. Then, with the transferred graphene on top of the dielectric waveguide, optical modulation may be achieved by tuning the transmission state of the graphene material.

In various embodiments, a monolithically integrated device may be designed, having a MIR quantum cascade laser (QCL), a surface-plasmon-waveguide-based graphene modulator, and a directional optical power out-coupler. By employing a dielectric loaded surface plasmonic waveguide, the electric field may be strongly enhanced at the graphene region, enabling a stronger interaction between the light and graphene, and, thus, a small footprint of the integrated modulator, which may be favorable for high-speed operation due to a reduced parasitic effect. Furthermore, using a flip-chip bonding technique, a high-resistivity silicon wafer may be chosen as the substrate. This may minimise or eliminate the parasitic capacitance between the contact pad and the substrate that may often act as a high-speed performance killer of an RF device. Estimated with a circuit model, the optical modulator of various embodiments may operate up to ~5 GHz. Moreover, due to graphene's broadband absorption nature and/or absence of a resonance element, the modulator may support a wide optical bandwidth. Further, the integration scheme makes the optical modulator compatible with the mature silicon-on-insulator (SOI) platform, which may be employed with the optical modulator to form a more complex active photonic circuit to extend the functionality of the optical modulator.

The design of a surface-plasma (or plasmon)-waveguide-based graphene MIR modulator will now be described by way of the following non-limiting examples, and with reference to FIGS. 2A to 2C, and 3A to 3C.

Figure 2A:
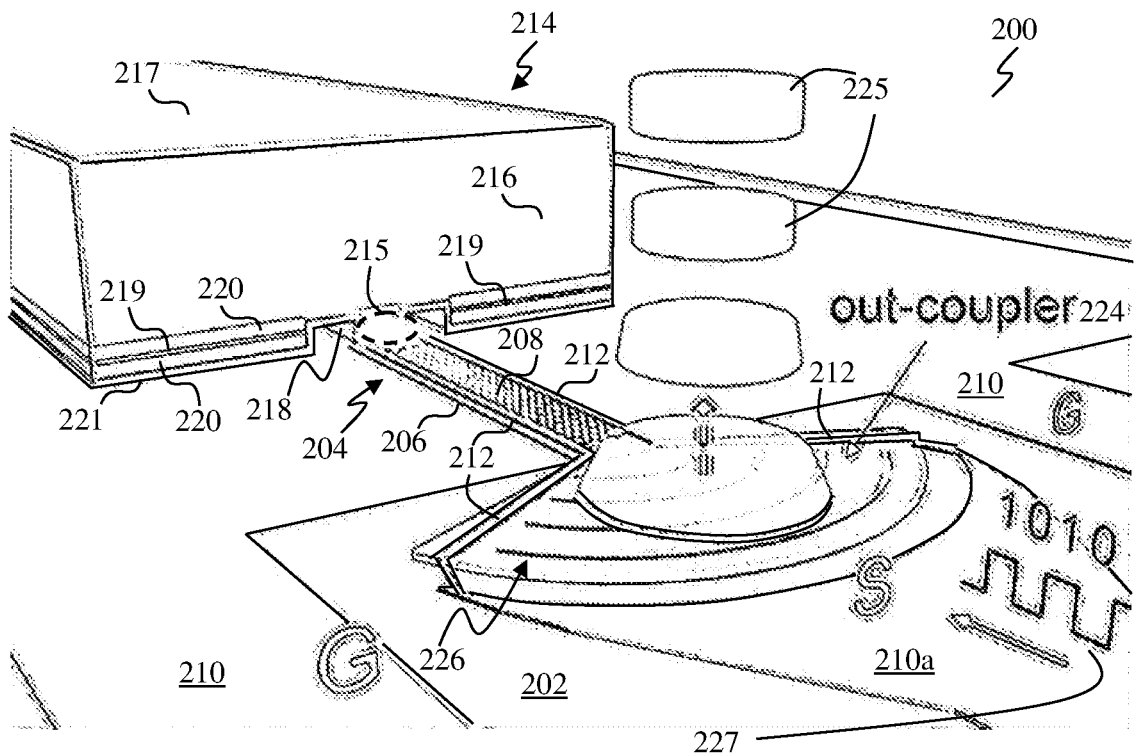
FIG. 2A shows a partial perspective schematic view of an optical modulator, according to various embodiments.
Figure 2B:
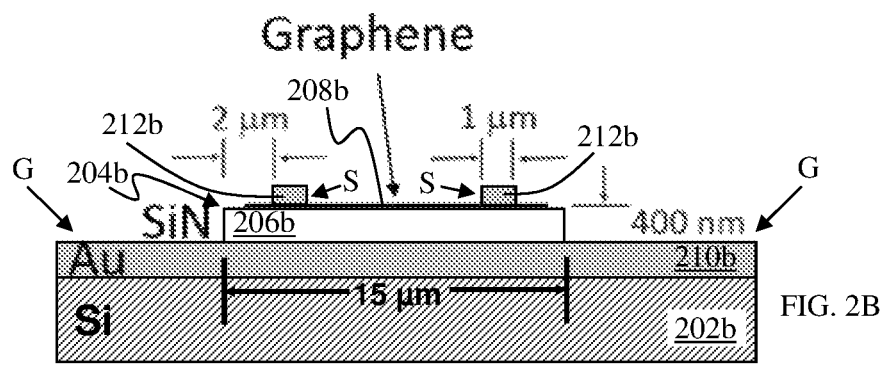
FIG. 2B shows a cross-sectional view of a waveguiding arrangement of an optical modulator, according to various embodiments.

FIG. 2A shows a partial perspective (3D) schematic view of an optical modulator 200, while FIG. 2B shows a cross-sectional view of a waveguiding arrangement 204b, according to various embodiments.

The optical modulator 200 may include a waveguiding arrangement 204, which may be the waveguiding arrangement 204b. The waveguiding arrangement 204, 204b may include a dielectric (e.g., SiN) waveguide 206, 206b, and a graphene layer 208, 208b on top of the waveguide 206, 206b. SiN or other transparent materials such as sapphire may be used as the dielectric layer or waveguide 206, 206b as it features a low optical loss in the MIR region.

The waveguiding arrangement 204, 204b may be formed on a substrate (e.g., Si) 202, 202b, having a metal layer (e.g., Au) 210, 210b. Two contacts 212, 212b may be formed on the graphene layer 208, 208b. The metal layer 210, 210b may also serve as a contact.

As illustrated in FIG. 2B, the waveguide 206b may have a thickness of about 400 nm. The waveguide 206b may also have a width of about 15 μm.

An optical (light) source 214 may be optically coupled to provide input light (represented as dashed circle 215) to the waveguiding arrangement 204. The optical source 214 may be monolithically integrated with the waveguiding arrangement 204 on the substrate 202. The optical source 214 may include a substrate (e.g., indium phosphide (InP)) 216, a back contact (e.g., Au) 217, a (waveduide) ridge structure 218 from which the input light 215 may be provided, an active region 219 for light generation sandwiched by cladding regions (e.g., InP) 220, and an insulation layer 221. As a non-limiting example, the optical source 214 may be a MIR (mid-infra red) source. As a further non-limiting example, the optical source 214 may be a laser, such as a quantum cascade laser (QCL), e.g., a MIR QCL.

In various embodiments, a dielectric-loaded surface plasma (or plasmon) waveguide may be provided, having a plain metal surface 210, 210b, and a dielectric strip 206, 206b on top of it.

As described, in various embodiments, the device or optical modulator 200 may integrate a dielectric-loaded surface plasma (or plasmon) waveguide with a MIR quantum cascade laser (QCL) ridge 218 on the same Si platform. The MIR QCL 214 may be bonded epilayer down onto the receiver substrate 202 using thermo-compression method.

A surface out-coupler 224 may also be incorporated, optically coupled to the dielectric waveguide 206, to provide a collimated surface-emitting output light (or laser beam) 225, illustrated as light pulses in FIG. 2A as a non-limiting example. The optical out-coupler 224 may include a grating structure 226. The optical out-coupler 224 may be an extension of the dielectric waveguide 206. As illustrated in FIG. 2A, the out-coupler 224 may be fan-shaped.

The two contacts 212 may be extended onto the optical out-coupler 224 and connected to a contact region (e.g., Au) 210a. The contact region 210a may be patterned from a layer that is also used for forming the metal layer 210, 210b.

The graphene layer 208 may be modulated, for example, its optical absorption or transmission state, by application of an electrical or modulation signal 227 (illustratively shown as a square wave signal as a non-limiting example) to the contacts 212 via the contact region 210a. The signal 227 may be represented by "1" to indicate that the graphene layer 208 is being modulated or tuned, and by "0" to indicate that the graphene layer 208 is not being modulated or tuned. Each of "1" and "0" may represent 50% of one period such that a pair of "1" and "0" may be taken to represent a period of the signal 227. As a result of the application of the signal 227 (e.g., square-wave signal represented by a "1010" string), the output light 225 may be modulated. Depending on the specific voltage applied, the output light 225 may be pulsed or continuous with alternate high and low intensity.

As described, it should be appreciated that the optical modulator 100 may modulate light (derived from the input light 215) propagating through the dielectric waveguide 206 so as to provide a modulated output light 225.

As illustrated in FIGS. 2A and 2B, the contacts (or electrodes) 210, 210a, 210b, 212, 212b of the optical modulator 200 may be designed in a Ground-Signal-Ground (GSG) configuration which may be suitable for RF (radio frequency) operation and/or high-speed operation.

Figure 2C:
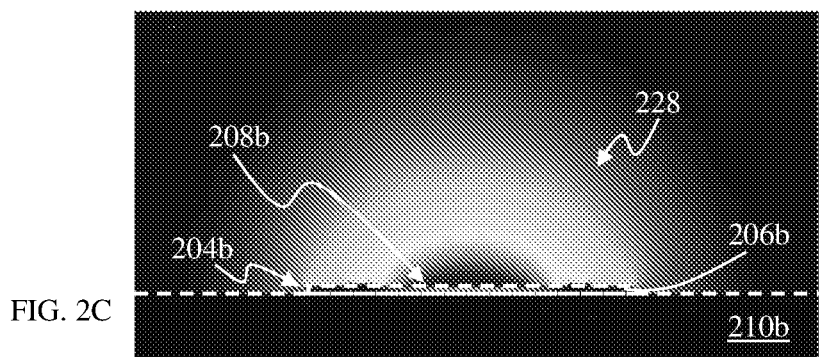
FIG. 2C shows a result of the calculated electric field profile of the dielectric-loaded surface plasmonic waveguide (9 μm wavelength) of various embodiments.

In various embodiments, the dielectric waveguide or strip 206, 206b may serve as both an insulation layer for the bottom gate (metal layer 210, 210b) (for the gating of graphene 208, 208b) and a dielectric load for the surface plasmonic wave, which may provide lateral and vertical confinement of the electric field and may greatly enhance the electric field intensity in the graphene region 208, 208b (see also FIG. 2C).

FIG. 2C shows a result of the calculated electric field profile 228 of the dielectric-loaded surface plasmonic waveguide (9 μm wavelength) of various embodiments. It shows the cross-sectional electric field profile 228 of the waveguide arrangement 204b, which manifests mode confinement both in the lateral and vertical directions. Compared to the known surface plasma waveguide made by a bare metallic strip, the dielectric-loading scheme of various embodiments may enable a much stronger mode confinement onto the surface of the waveguide arrangement 204b, and thus a strengthened interaction between light and graphene 208b.

Accordingly, as described, in various embodiments, a modulator (e.g., 100) may be provided, having a metal layer (e.g., 210, 210b) arranged on a substrate (e.g., 202, 202b), a dielectric layer (e.g., 206, 206b) arranged on the metal layer, and a graphene layer (e.g., 208, 208b) arranged on the dielectric layer. The modulator may further include contacts (e.g., 212, 212b) formed on the graphene layer. An electrical signal (e.g., 227) may be applied to the contacts to tune the absorption of light (via tuning of the graphene layer). The substrate may include silicon (Si). The metal layer may include gold (Au) and/or silver (Ag). The dielectric layer may include at least one of silicon nitride (SiN), sapphire, amorphous silicon (a-Si) or germanium (Ge). The contacts may include at least one of titanium (Ti), aluminum (Al), copper (Cu), palladium (Pd), nickel (Ni), and platinum (Pt) with gold (Au) on top.

In example embodiments, the maximum light intensity may be at the "dielectric-air interface" where the graphene layer (e.g., 208, 208b) may be positioned so that the graphene layer may interact much more strongly with the electric field. In other words, various embodiments may provide a stronger interaction between light and the graphene layer, thus increasing the modulation depth of the optical modulator. The QCL source (e.g., 214) may be monolithically integrated to provide on-chip broadband operation of the device/modulator at different MIR wavelength span.

The fabrication of the graphene-based Si MIR modulator will now be described by way of the following non-limiting example.

The fabrication process may start from the deposition of gold (Au) on a silicon (Si) wafer to reach a designed Au thickness of about 700 nm for the thermal compression bonding process to be carried out later for the QCL device. Next, about 300 nm thick silicon nitride (SiN) may be deposited by Plasma Enhanced Chemical Vapor Deposition (PECVD) process over the entire Si wafer (e.g., over the Au material), followed by a lithography and etching process to form a dielectric waveguide.

Separately, graphene may be CVD-grown on a copper (Cu) substrate or foil. The graphene material or layer may be coated with poly(methyl methacrylate) (PMMA) for protection of the graphene material. Then, the graphene material may be transferred onto the chip (e.g., onto the dielectric waveguide) via a graphene transfer process. The copper substrate may be removed by wet-etching in an ammonium persulfate solution and the remaining PMMA/graphene sheet may be transferred onto the chip. The PMMA layer may be removed with acetone.

In greater detail, the PMMA-coated graphene layer on copper (Cu) foil may be etched in an ammonium persulfate (0.1M) solution for >3 hours and the remaining PMMA/graphene may be floated in the solution. The PMMA/graphene may then be transferred and floated on clean Deionized-water. The device or chip may then be put in the water and picked up whereas the PMMA/graphene is lying on the device. The PMMA/graphene layer may then be annealed in nitrogen at about 160° C. for about 90 minutes to enhance the adhesion between the graphene layer and the surface of the device. Finally, the PMMA layer may be removed with acetone.

A lithography process and an oxygen ($O_2$) plasma treatment may be conducted to pattern the graphene, followed by a lithography and lift-off process to form one or more contacts (e.g., titanium/gold (Ti/Au) contact(s)) onto the graphene layer. Post-processing treatments such as annealing may be carried out to improve the quality of the metal contact(s). Further, other metal materials may be employed to achieve a lower contact resistance, such as nickel (Ni), which may be promising for a faster optical modulation.

A QCL device fabricated from another process may be bonded (e.g., via thermal compression bonding) onto a selected position on the chip in order to couple the output light of the QCL into the waveguide of the modulator.

An out-coupler may be formed on the chip, for example, in the form of a grating. The grating may be formed by the deposition of a silicon nitride (SiN) layer, followed by a lithography process to define the grating pattern. Then, unnecessary SiN may be removed by dry etching and the remaining photoresist may be removed by acetone. A second order grating may be designed and simulated in order to couple the output light in the vertical direction.

Figure 3A:
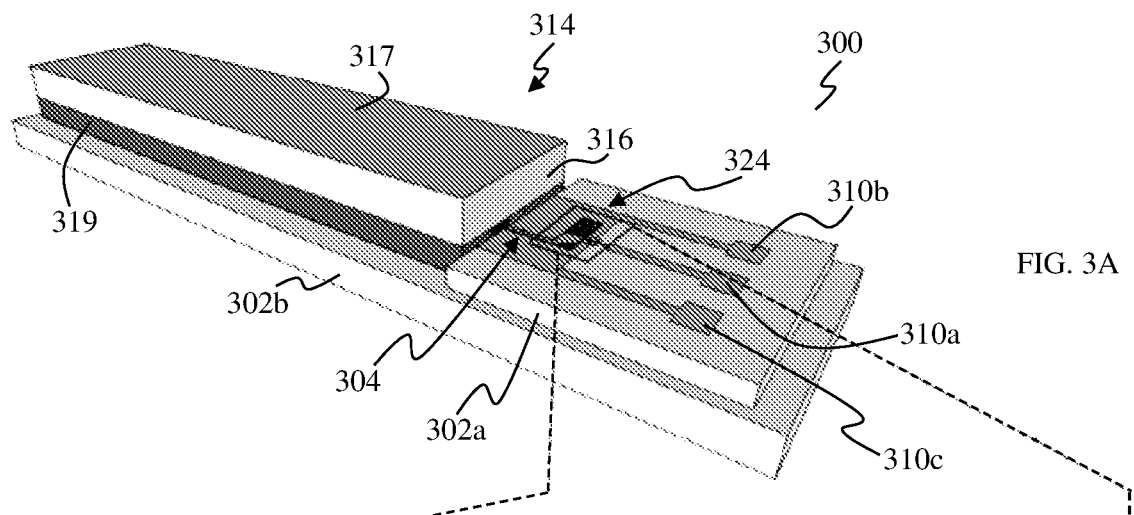
Figure 3B:
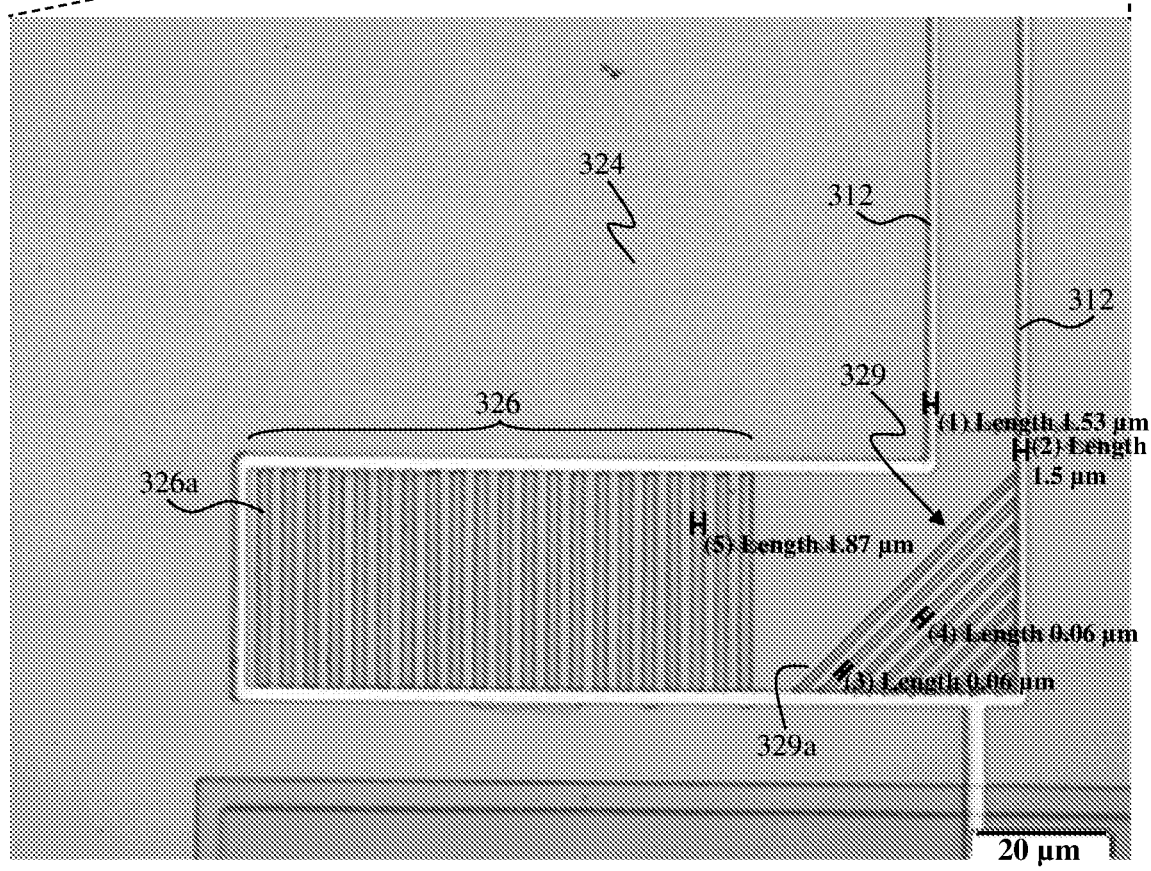
FIG. 3B shows a microscope image of the output coupler of the optical modulator of FIG. 3A, according to various embodiments.

FIG. 3A shows a perspective schematic view of a fabricated optical modulator 300, while FIG. 3B shows a microscope image of the output coupler 324 of the optical modulator 300. The optical modulator 300 may include a graphene modulator, in the form of a waveguiding arrangement 304 having a dielectric waveguide (not shown) and a graphene layer (not shown) on top of the waveguide. The waveguiding arrangement 304 may be provided or formed on a substrate (e.g., Si) 302a. An output coupler 324 may be optically coupled to the waveguiding arrangement 304 to output light from the waveguiding arrangement 304. A signal contact (or electrode) 310a and ground contacts (or electrodes) 310b, 310c may be provided electrically coupled to the waveguiding arrangement 304. These electrodes 310a, 310b, 310c may be used for tuning of the absorption characteristic of the graphene layer.

An MIR QCL 314 may be optically coupled to provide input light to the waveguiding arrangement 304. The optical source 314 may include a substrate (e.g., InP) 316, a back contact (e.g., Au) 317, and an active (QCL) region 319 for light generation. While not shown, there may be one or more other feature(s) or layer(s) which may be as described in the context of the optical source 214 (FIG. 2A). As a non-limiting example, the MIR QCL 314 may have a laser ridge (e.g., similar to ridge 218, FIG. 2A). The QCL 314 may be provided on or bonded to a substrate (e.g., Si) 302b. The substrates 302a, 302b may be bonded to each other.

Contacts (e.g., Au) 312 may be provided on top of the graphene layer of the waveguiding arrangement 304, and extending to the output coupler 324 (please see FIG. 3B). Contacts 312 may be electrically coupled to the signal contact 310a.

Referring to FIG. 3B, the output coupler 324 may include a surface plasmon polariton (SPP) deflector 329 having a plurality of metal (e.g., Au) strips (as represented by 329a for one metal strip). The output coupler 324 may further include an outcoupling grating 326 having a plurality of metal (e.g., Au) strips (as represented by 326a for one metal strip). Output light may be emitted via the outcoupling grating 326.

For measurement, the transmission state of the graphene layer may be electrically controlled by application of a DC voltage through probe contacts to the electrodes 310a, 310b, 310c. The output light from the optical modulator 300 may then be collected by an objective lens onto an HgCdTe (mercury cadmium telluride; MCT) detector (FTIR-16-0.25, InfraRed Associate, Inc.). The output signal of the MCT detector may be sent to a lock-in amplifier for intensity characterization. It should be appreciated that, for static modulation, a DC voltage may be applied, whereas an AC/RF voltage may be applied for dynamic modulation (alternating high and low outputs).

Figure 3C:
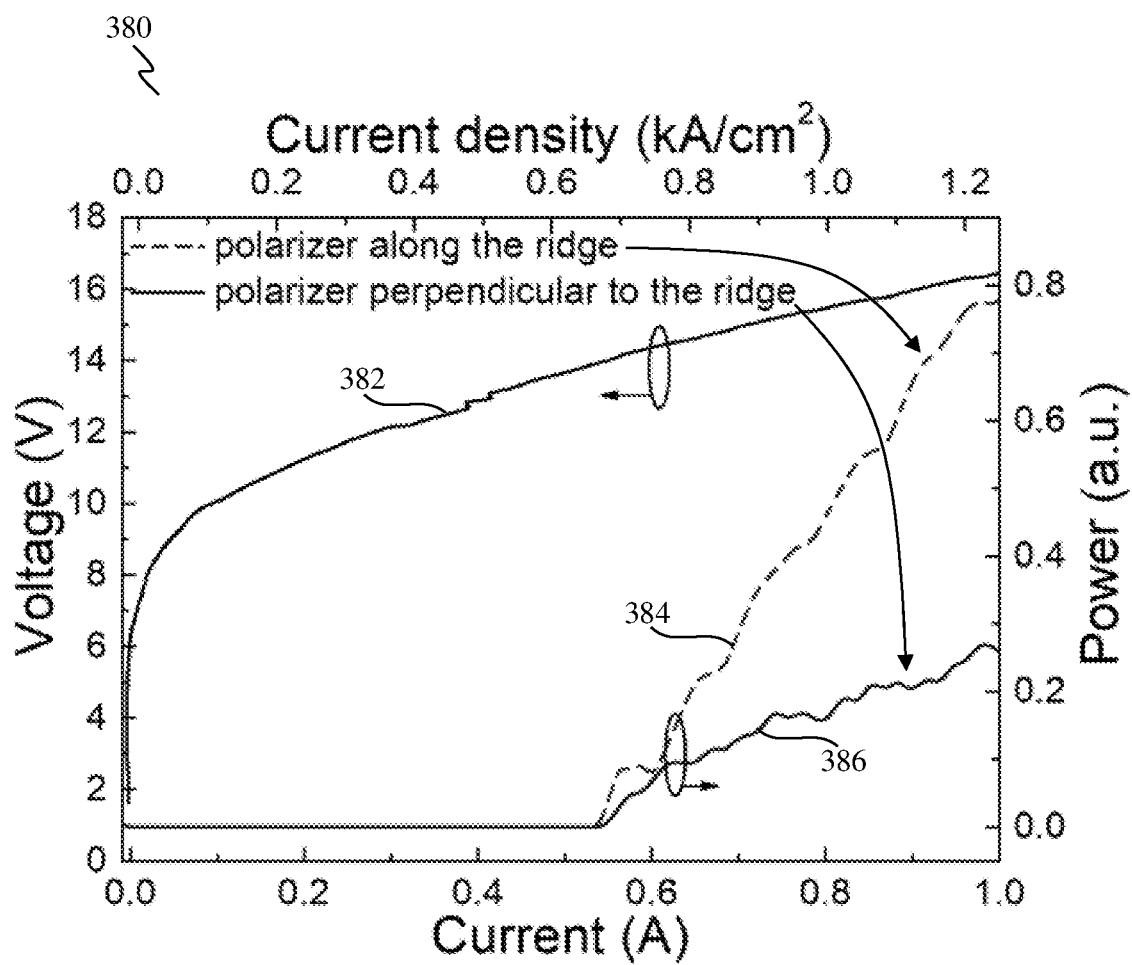
FIG. 3C shows a plot of LIV (light (or power)-current-voltage) curves for the optical modulator of FIG. 3A.

The optical modulator 300 may be tested under pulsed mode and the preliminary result is as shown in FIG. 3C illustrating a plot 380 of LIV (light (or power)-current-voltage) curves for the optical modulator 300 with integrated MIR QCL 314. The plot 380 shows an IV curve 382 and two LI curves 384, 386. The curve 384 corresponds to the direct emission power from the QCL 314 that is not coupled to the plasmonic waveguide arrangement 304, while the curve 386 corresponds to the power coupled to the plasmonic waveguide arrangement 304, which may then be scattered out of the grating 326 and thus with a polarization perpendicular to the laser ridge. A large proportion of the direct emission light (curve 384) is due to the misalignment of the laser ridge to the plasmonic waveguide arrangement 304, which may be improved via fabrication optimization. It may be seen that while the monolithic integrated QCL device 314 may be working well; however, there are challenges in that just a small portion of the power is coupled into the dielectric waveguide, confirmed by the measurement of the polarized output power at two directions, which may be improved with better alignment.

As described, various embodiments may provide a MIR Si modulator based on a dielectric-loaded surface plasma waveguide configuration. The plasma waveguide is designed to enhance the light intensity at the graphene layer to further enhance the modulation efficiency. The QCL may be monolithically integrated within the same platform and may efficiently generate the light for the on-chip modulation. Because of the broadband response of the graphene material, the modulation bandwidth may be wide with a broadband QCL active source, which may be promising for a number of applications Improvements to the graphene-based Si modulator may be made by providing a better alignment between the monolithic QCL source and the waveguide, and/or the optimization of the structure by taking RC effect into consideration for a higher modulation speed.

As also described, the waveguiding arrangement (e.g., a dielectric-loaded waveguide) of the optical modulator may provide a light intensity profile of the surface plasmon mode where the maximum light intensity may be at the "dielectric-air interface" so that the graphene layer may interact much more strongly with the associated electric field. In this way, a stronger interaction between light and the graphene layer may increase the modulation depth for the optical modulator.

In various embodiments, the use of a waveguiding arrangement for propagation of light may make it possible to integrate with other components on the same chip, e.g., light source and/or detector. A bonded QCL on the chip may act as the light source and the optical modulator with its various components may be on the silicon (Si) platform which is compatible with the semiconductor technology. The overall device or optical modulator may be compact and portable.

For the optical modulator of various embodiments, the nature of the surface plasmonic wave may be different from known modulators in that the maximum intensity may be located at a position coinciding with the graphene layer in various embodiments. For example, by properly choosing the thickness of waveguide (e.g., SiN), the maximum intensity may be pushed to the "waveguide-air interface" where the graphene layer may be arranged. As a result, (1) as the maximum of the light is far away from the metal, the insertion loss of the modulator is reduced, and (2) as the graphene is now located at the intensity maximum, the graphene-light interaction is stronger, making the optical modulator more efficient.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical modulator comprising:
a substrate; and
a waveguiding arrangement on the substrate,
an optical light source on the substrate, the optical light source being optically coupled to and monolithically integrated with the waveguiding arrangement; and
an optical out-coupler optically coupled to the waveguiding arrangement,
wherein the waveguiding arrangement comprises:
a waveguide; and
at least one graphene layer arranged to interact with light propagating in the waveguiding arrangement,
wherein the waveguide is designed such that the light interacting with the at least one graphene layer has a maximum intensity overlapping with the at least one graphene layer, and
wherein the optical out-coupler comprises a second order grating configured to receive the light from the waveguiding arrangement to provide a surface-emitting output light in a direction perpendicular to a direction of the light propagating in the waveguiding arrangement.

2. The optical modulator as claimed in claim 1, wherein the waveguide is designed to have a thickness of between about 250 nm and about 450 nm.

3. The optical modulator as claimed in claim 1, wherein the waveguide is designed to have a width of between about 15 μm and about 30 μm.

4. The optical modulator as claimed in claim 1, wherein the waveguide comprises a dielectric waveguide.

5. The optical modulator as claimed in claim 1, wherein the at least one graphene layer is arranged on top of the waveguide or is embedded within the waveguide.

6. The optical modulator as claimed in claim 1, wherein the at least one graphene layer comprises two graphene layers arranged spaced apart from each other.

7. The optical modulator as claimed in claim 1, wherein the substrate comprises a metal layer.

8. The optical modulator as claimed in claim 1, wherein the optical light source comprises a quantum cascade laser.

9. A method for forming an optical modulator, the method comprising:
    forming a waveguiding arrangement on a substrate, comprising:
        forming a waveguide; and
        forming at least one graphene layer to interact with light propagating in the waveguiding arrangement,
    forming an optical light source on the substrate, the optical light source being formed optically coupled to and monolithically integrated with the waveguiding arrangement; and
    optically coupling an optical out-coupler to the waveguiding arrangement,
    wherein forming a waveguide comprises designing the waveguide such that the light interacting with the at least one graphene layer has a maximum intensity overlapping with the at least one graphene layer, and
    wherein the optical out-coupler comprises a second order grating configured to receive the light from the waveguiding arrangement to provide a surface-emitting output light in a direction perpendicular to a direction of the light propagating in the waveguiding arrangement.

10. The method as claimed in claim 9, wherein the optical light source comprises a quantum cascade laser.

11. The method as claimed in claim 9, wherein forming at least one graphene layer comprises forming two graphene layers spaced apart from each other.

12. The method as claimed in claim 9, wherein designing the waveguide comprises designing a thickness of the waveguide to be between about 250 nm and about 450 nm.

13. The method as claimed in claim 9, wherein designing the waveguide comprises designing a width of the waveguide to be between about 15 μm and about 30 μm.

14. The method as claimed in claim 9, wherein the waveguide comprises a dielectric waveguide.

15. The method as claimed in claim 9, wherein forming at least one graphene layer comprises forming the at least one graphene layer on top of the waveguide or embedded within the waveguide.

16. A method for controlling an optical modulator, the method comprising:
    supplying a light using an optical light source to a waveguiding arrangement of the optical modulator for propagation in the waveguiding arrangement to provide a surface-emitting output light via an optical out-coupler of the optical modulator, the optical light source and the waveguiding arrangement being formed on a substrate of the optical modulator, wherein the optical light source is optically coupled to and monolithically integrated with the waveguiding arrangement, wherein the optical out-coupler is optically coupled to the waveguiding arrangement, wherein the waveguiding arrangement comprises a waveguide, and at least one graphene layer arranged to interact with the light, and wherein the waveguide is designed such that the light interacting with the at least one graphene layer has a maximum intensity overlapping with the at least one graphene layer, and wherein the optical out-coupler comprises a second order grating configured to receive the light from the waveguiding arrangement to provide the surface-emitting output light in a direction perpendicular to a direction of the light propagating in the waveguiding arrangement; and
    applying an electrical signal to the at least one graphene layer.

17. The method as claimed in claim 16, further comprising varying a magnitude of the electrical signal.

18. The method as claimed in claim 16, wherein the optical light source comprises a quantum cascade laser.

* * * * *